(12) United States Patent
Wang et al.

(10) Patent No.: US 7,760,437 B2
(45) Date of Patent: Jul. 20, 2010

(54) PROJECTOR APPARATUS HAVING A SHIELDING PLATE TO PREVENT FORMATION OF GHOST IMAGE IN THE PROJECTED IMAGE

(75) Inventors: Wan-Chiang Wang, Hsinchu (TW); Che-Shine Tsai, Hsinchu (TW); Hao-Wei Pan, Hsinchu (TW)

(73) Assignee: Young Opics Inc., Hsinchu (TW)

( * ) Notice: Subject to any disclaimer, the term of this patent is extended or adjusted under 35 U.S.C. 154(b) by 101 days.

(21) Appl. No.: 11/124,227

(22) Filed: May 9, 2005

(65) Prior Publication Data
US 2005/0270626 A1  Dec. 8, 2005

(30) Foreign Application Priority Data
Jul. 6, 2004  (TW)  ................. 93120250 A

(51) Int. Cl.
*G02B 9/00* (2006.01)
(52) U.S. Cl. ............................. 359/649; 345/7; 348/614
(58) Field of Classification Search ................. 359/649; 353/97; 348/614
See application file for complete search history.

(56) References Cited

U.S. PATENT DOCUMENTS

| 6,023,365 | A  * | 2/2000  | McDonald ................. 359/291 |
| 6,490,095 | B2 * | 12/2002 | Okuyama et al. ........... 359/631 |
| 6,966,658 | B2 * | 11/2005 | Fushimi et al. ............. 353/102 |
| 2002/0105622 | A1 * | 8/2002 | Wang .......................... 353/69 |
| 2003/0090597 | A1 * | 5/2003 | Katoh et al. ................. 348/744 |

FOREIGN PATENT DOCUMENTS

| JP | 2002-122805 | 4/2002 |
| JP | 2003337302 | 11/2003 |
| TW | 491364 | 3/1991 |

OTHER PUBLICATIONS

WO 03/032049 Fushimi et al "Projection Type Display Unit, Rear Projector and Multi-vision system"; Published Apr. 17, 2003, entire document.*
English language translation of abstract of JP 2003337302 (published Nov. 28, 2003).

* cited by examiner

*Primary Examiner*—Jessica T Stultz
(74) *Attorney, Agent, or Firm*—Thomas, Kayden, Horstemeyer & Risley

(57) ABSTRACT

A projector apparatus includes a light source for producing light beams, a micromirror device including an array of micromirrors for modulating and reflecting the light beams into image light beams, and a projection lens unit for magnifying and projecting the image light beams. The projection lens unit includes an optical lens disposed adjacent to the micromirror device, and a light shielding plate mounted on the optical lens or between the micromirror device and the optical lens for covering bias light so as to prevent formation of a ghost image in the projected image.

9 Claims, 5 Drawing Sheets

PROJECTOR APPARATUS HAVING A SHIELDING PLATE TO PREVENT FORMATION OF GHOST IMAGE IN THE PROJECTED IMAGE

FIELD OF THE INVENTION

The invention relates to a projector apparatus, more particularly to a projector apparatus that uses digital light processing technology to process the light beams and that includes a shielding plate to prevent formation of ghost image in the projected image.

BACKGROUND OF THE INVENTION

A projector apparatus of today uses digital light processing technology to process the light beams from the light source to become image light beams for being projected onto the wall screen. Therefore, today's projector apparatus serves an integral part of a home theater system.

Note that the digital light processing technology is capable of modulating electrical signals into image light beams which are later projected successively or intermittently onto the large screen via a projection lens unit. A semiconductor chip (generally known as a DMD: digital micromirror device) is used in the projector apparatus, and includes several millions of tiny mirrors.

Referring to FIG. 1, a conventional projector apparatus 10 (generally known as DLP projector) using digital light processing technology is shown and includes a light source 12, a DMD chip 14 and a projection lens unit 16. The light source 12 is capable of producing light beams for the DMD chip 14 to modulate and reflect the light beams into image light beams for being projected onto a wall screen (not shown) via the projection lens unit 16. The projection lens unit 16 may include several optical lenses which magnify and project the magnified image onto the wall screen.

The light source 12 includes a lamp 121, a color-filtering wheel 122, a light integrator 123, a condensing lens unit 124, a reflective mirror 125 and a total internal reflection prism 126. A light-collecting shield is disposed around the lamp 121 in order to collect and focus the light beams. The color-filtering wheel 122 is disposed frontward of the lamp 121 in order to provide multi-colors effect. The light integrator 123 directs the light beams homogeneously into the condensing lens unit 124 which defines a light path for the light beams. Later, the reflective mirror 125 directs the light beams into the reflection prism 126, which, in turn, directs the light beams into the DMD chip 14 with a predetermined angle of incidence (generally 24 degrees) so that the DMD chip 14 when at the "On" status modulates and reflects the light beams into the projection lens unit 16. Finally, the projection lens unit 16 magnifies, focuses and projects the image onto the wall screen.

Referring again to FIG. 1, in the aforesaid conventional projector apparatus, the projection lens unit 16 is disposed parallel with the condensing lens unit 124 in order to reduce the dimension of the apparatus and the light beams emitted by the lamp 121 are directed perpendicularly to the reflection prism 126 with the assistance of the reflective mirror 125 such that the reflected light beams travel in a direction parallel with the light beams. Alternately, in other conventional projector apparatus, the condensing lens unit 124, the color-filtering wheel 122, and the projection lens unit 16 can be arranged in a straight line without employment of the reflective mirror 125.

In addition, there are still other conventional DLP projectors using three DMD chips, wherein each DMD chip is responsible for producing a specific color, such as blue, green and red.

The center core of the digital projector apparatus resides in the DMD chip 14 (see FIG. 2) that includes several millions of tiny mirrors 141. Each of the tiny mirrors is made from aluminum alloy, and has a cross-section of 14×14 micro millimeter that is smaller than cross-section of a single hair strand. As illustrated in FIG. 2A, each tiny mirror 141 is rotatable about the a-b axis and is generally rectangular in shape. FIG. 2B shows a cross-sectional view of the tiny mirror 141 taken along 8-8 lines in FIG. 2A, wherein the mirror 141 rotates 12 degrees in the anti-clockwise direction with respect to the axis a-b in case the tiny mirror 141 is at the "On" status, where the reflective light beam R1 of the incoming light beam Lo is directed to the projection lens unit 16 so as to project the image on the wall screen. On the other hand, the tiny mirror 141 rotates 12 degrees in the clockwise direction with respect to the axis a-b in case the former is at the "Off" status, where the reflective light beam R2 of the incoming light beam Lo is directed away from the projection lens unit 16. Since the digital information is referred to either "1" or "0", the tiny mirror 141 rotates about the a-b axis in "On" and "Off" statuses.

Note that the tiny mirrors 141 in the DMD chip 14 rotate with respect to the axis a-b axis either in the clockwise or anti-clockwise direction when the digital signal is 0 or 1 according to the difference of the modulated voltages. When no modulated voltage is applied onto the chip 14, the tiny mirrors 141 extend in a direction parallel with a common plane defined by the chip 14. We generally call it a "Flat" status.

FIG. 3 illustrates how the projection lens unit 46 projects the projected image 26 onto the wall screen 24 by virtue of the reflected light beams R1 from the DMD chip 14. Note that the reflected light beams R1 from the incoming light beams Lo enter the projection lens unit 46 and are projected onto the wall screen 24 as a projected image when the tiny mirrors 141 are in the "On" status. On the other hand, the reflected light beams R2 from the incoming light beams Lo are directed away from the projection lens unit 46 when the tiny mirrors 141 are in the "Off" status so as to prevent undesired effect resulting on the projected image 26.

In fact, when the DMD chip 14 is in operation, several millions of the tiny mirrors 141 rotate reciprocally and ceaselessly in the clockwise and anti-clockwise directions (i.e. On>Flat>Off or Off>Flat>On). Under this condition, the reflected light beams generated during the converting period between the "On" and "Off" statuses, are generally known as "bias light beams", and are not required for formation of the projected image. As a matter of fact, the bias light beams, which should not enter the projection lens unit 46, nevertheless enter the projection lens unit 46 during the converting period of the tiny mirrors 141 to cause the "ghost image" in the projected image 26. In other words, the "ghost image" is formed by the undesired internal reflection within the conventional DLP projector.

The conventional DLP projector is used in a conference room for presenting an intended scheme. Appearance of the "ghost image" during the presentation may lower the brightness and clarity of the projected image.

In case, the conventional DLP projector is used as part of a home theater system, the image projected onto the wall screen is required to be in better sharpness since the movie runs quickly. Under this condition, conversion of the tiny mirrors in the DMD chip between the "On" and "Off" statuses must also quicken in order to complement with the swift changing of the images. Appearance of the "ghost image" may lower the clarity and sharpness of the images being displayed, thereby degrading the display ability of the conventional DLP projector.

SUMMARY OF THE INVENTION

The object of the present invention is to provide a DLP projector including a shielding plate to prevent formation of ghost image in the projected image.

A projector apparatus according to the present invention includes: a light source for producing light beams; a micromirror device including an array of micromirrors for modulating and reflecting the light beams into image light beams; a projection lens unit for magnifying and projecting the image light beams and including an optical lens disposed adjacent to the micromirror device; and a light shielding plate mounted on the optical lens or between the micromirror device and the optical lens for covering bias light caused due to internal reflection so as to prevent formation of ghost image in the projected image.

In another aspect of the present invention, the projector apparatus includes: a light source for producing light beams; a micromirror device for modulating and reflecting the light beams into image light beams, the micromirror device including an array of micromirrors which are disposed in "On" or "Off" status when different modulated voltages are applied thereupon, the image light beams being reflected from the array of micromirrors when the array of micromirrors is disposed in the "On" status, the array of micromirrors being disposed in a Flat status when no modulated voltage is applied thereupon; a projection lens unit for magnifying and projecting the image light beams; and a light shielding plate disposed between the micromirror device and the projection lens unit in such a manner that the light shielding plate is disposed on a light path of the image light beams when the array of micromirrors is disposed in the Flat status.

In still another aspect of the present invention, a shielding plate is proposed for use in a projector apparatus that includes a light source, a micromirror device, and a projection lens unit, the light source producing light beams for the micromirror device which includes an array of micromirrors for modulating and reflecting the light beams into image light beams, the projection lens unit magnifying and projecting the image light beams and including an optical lens disposed adjacent to the micromirror device. The shielding plate is disposed on the optical lens or between the optical lens and the micromirror device for covering bias light caused due to internal reflection so as to prevent formation of ghost image in the projected image.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTIONS OF THE PREFERRED EMBODIMENT

Figure 4:
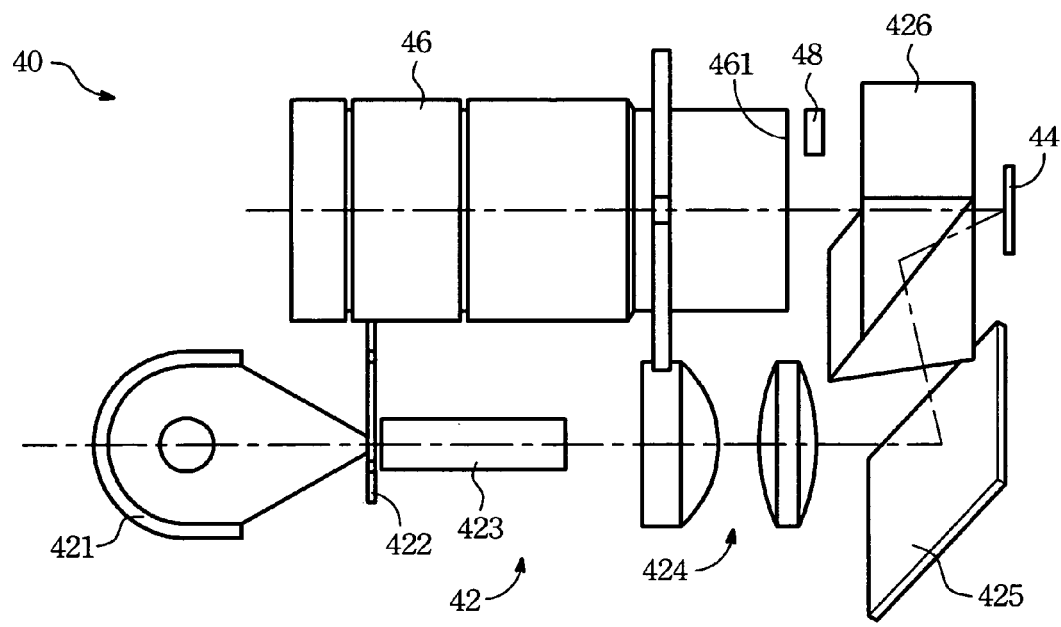
FIG. 4 illustrates the components of the preferred embodiment of a DLP projector apparatus according to the present invention.

Referring to FIG. 4, the preferred embodiment of a DLP projector apparatus 40 (which uses digital light processing technology to process digital signal) according to the present invention is shown and includes a light source 42, a DMD chip 44, a projection lens unit 46 and a shielding plate 48.

The light source 42 produces light beams for the DMD chip 44. The DMD chip 44 includes several millions of tiny mirrors arranged in an array to modulate the light beams into image light beams which are later projected onto a wall screen (shown in FIG. 4) via the projection lens unit 46. The projection lens unit 46 may consist several optical lenses depending on its utility thereof. In this embodiment, the projection lens unit 46 includes at least one optical lens 461 disposed adjacent to the DMD chip 44. As shown in FIG. 4, the shielding plate 48 is disposed between the projection lens unit 46 and the DMD chip 44 in order to prevent the bias light beams from entering the projection lens unit 46, thereby eliminating formation of ghost image in the projected image once the projected image is projected onto the wall screen by the projection lens unit 46 after magnifying operation thereof.

The light source 42 includes a lamp 421, a color-filtering wheel 422, a light integrator 423, a condensing lens unit 424, a reflective mirror 425 and a total internal reflection prism 426. A light collecting shield is disposed around the lamp 421 in order to collect and focus the light beams. The color-filtering wheel 422 is disposed frontward of the lamp 421 in order to provide multi-colors effect. The light integrator 423 directs the light beams homogeneously into the condensing lens unit 424 which defines a light path for the light beams. Later, the reflective mirror 425 directs the light beams into the reflection prism 426, which, in turn, directs the light beams into the DMD chip 44 with a predetermined angle of incidence (generally 24 degrees) so that the DMD chip 44 when at the "On" status reflects the light beams into the projection lens unit 46. Finally, the projection lens unit 46 magnifies, focuses and projects the image light beams onto the wall screen (not shown).

As illustrated in FIG. 4, the dimension of the present embodiment can be reduced relatively small by virtue of parallel position between the condensing lens unit 424 and the projection lens unit 46. Under such arrangement and by correcting the position of the reflective mirror 425 with respect to the reflection prism 426, the reflected light beams from the reflective mirror 425 can be arranged to hit the reflection prism 426 at the right angle. Alternately, in another embodiment of the present invention, by altering the positions of the condensing lens unit 424, the color filter wheel 422, the projection lens unit 46 and the lamp 421 light source 32, the light beams can be arranged in such a manner to enter the DMD chip 44 with an appropriate incident angle.

Figure 1:
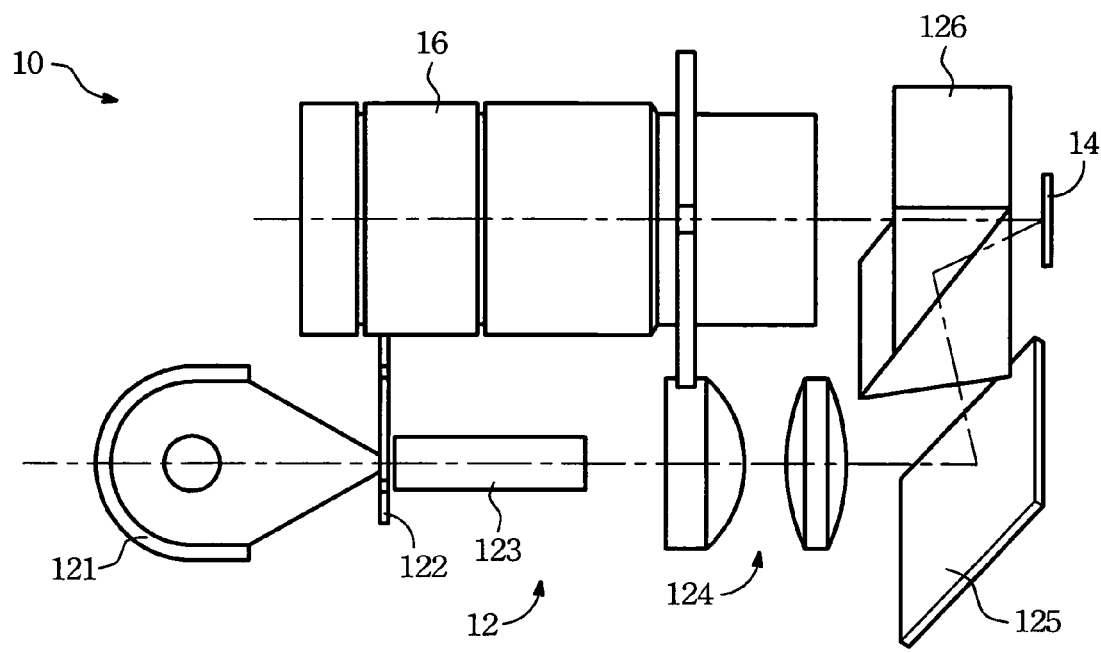
FIG. 1 shows components of a conventional DLP projector apparatus which utilizes a DMD chip shown in FIG. 2.
Figure 2:
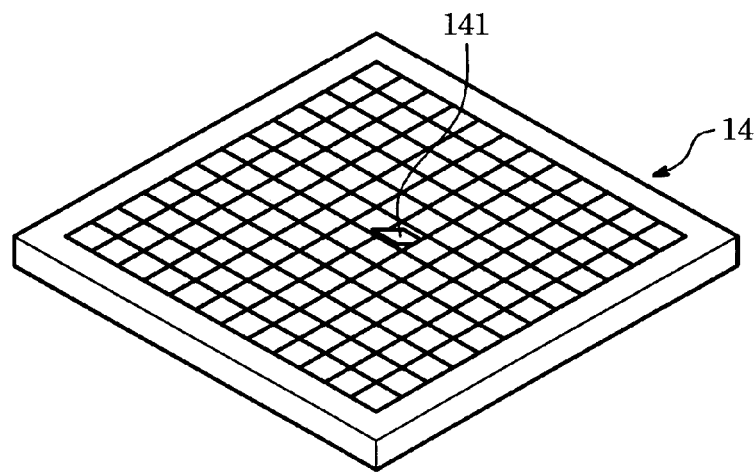
FIG. 2 is a perspective view of the DMD chip.
Figure 2A:
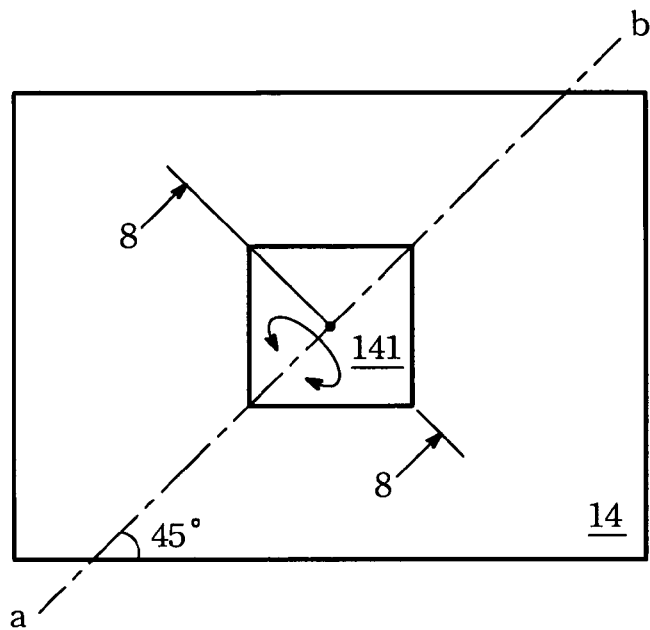
FIG. 2A is an enlarged view of a tiny mirror employed in the DMD chip shown in FIG. 2.
Figure 2B:
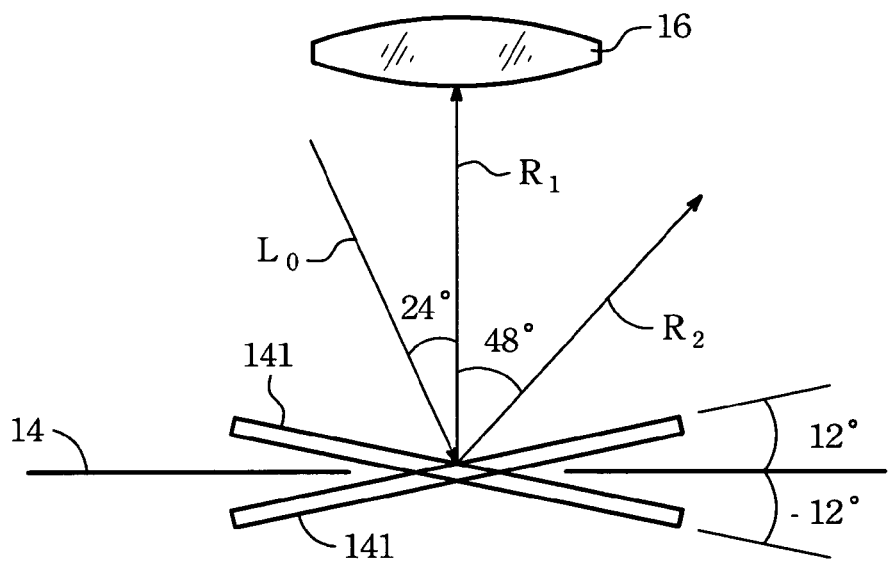
FIG. 2B illustrates how the tiny mirror reacts in response to the light beam under "On" or "Off" status.
Figure 3:
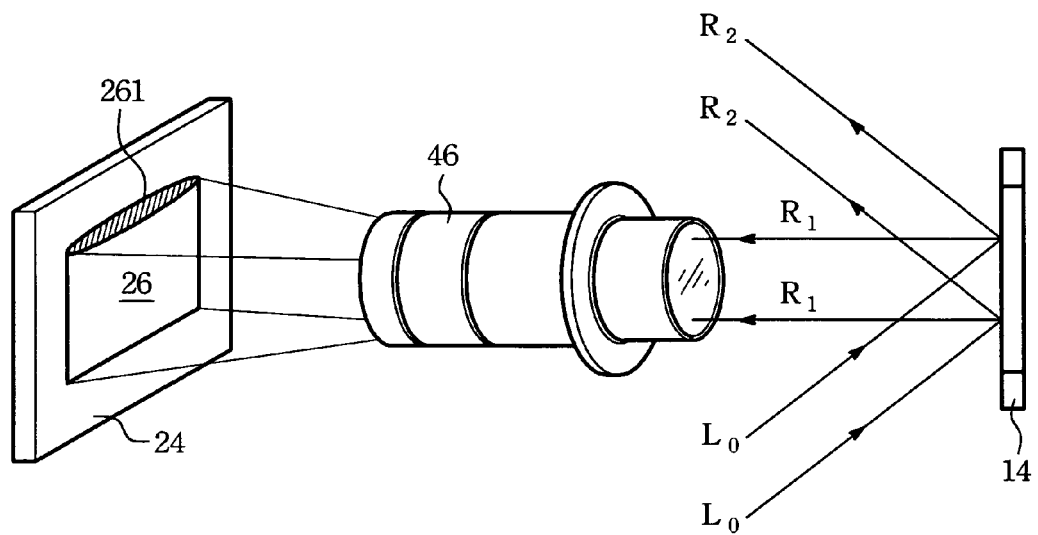
FIG. 3 illustrates how a ghost image is formed in the conventional DLP projector apparatus.

As illustrated in FIG. 3, the ghost image 261 is generally formed at one corner of the projected image 26. Under the most ideal condition, only those image light beams generated when the tiny mirrors 141 are disposed in the "On" status should enter the projection lens unit 16. However, the ghost image 261 is formed due to entry of the bias light beams generated during the converting period among the On>Flat>Off or Off>Flat>On status into the projection lens unit 46.

Figure 5A:
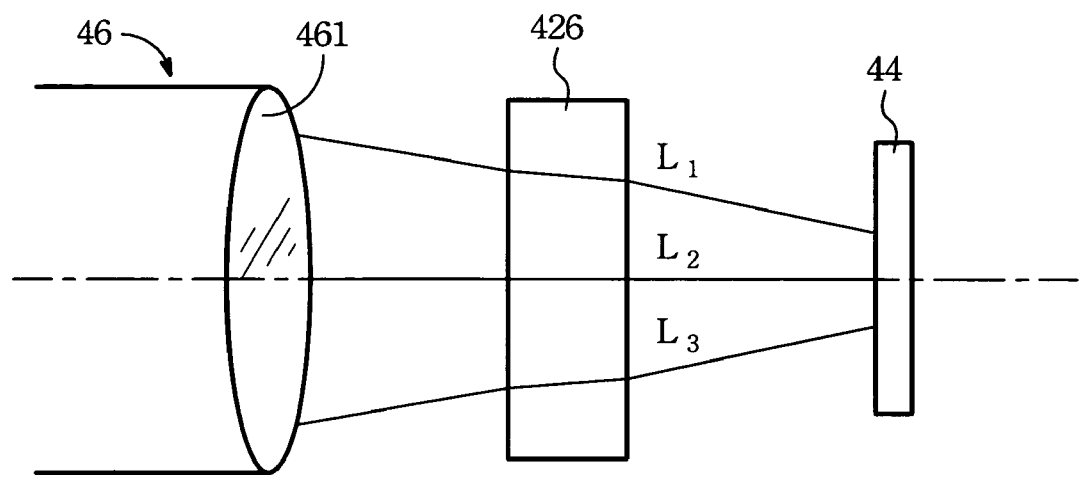
FIG. 5A illustrates the reflected light beams when the tiny mirrors in the DMD chip of the preferred embodiment is in the On status.
Figure 5B:
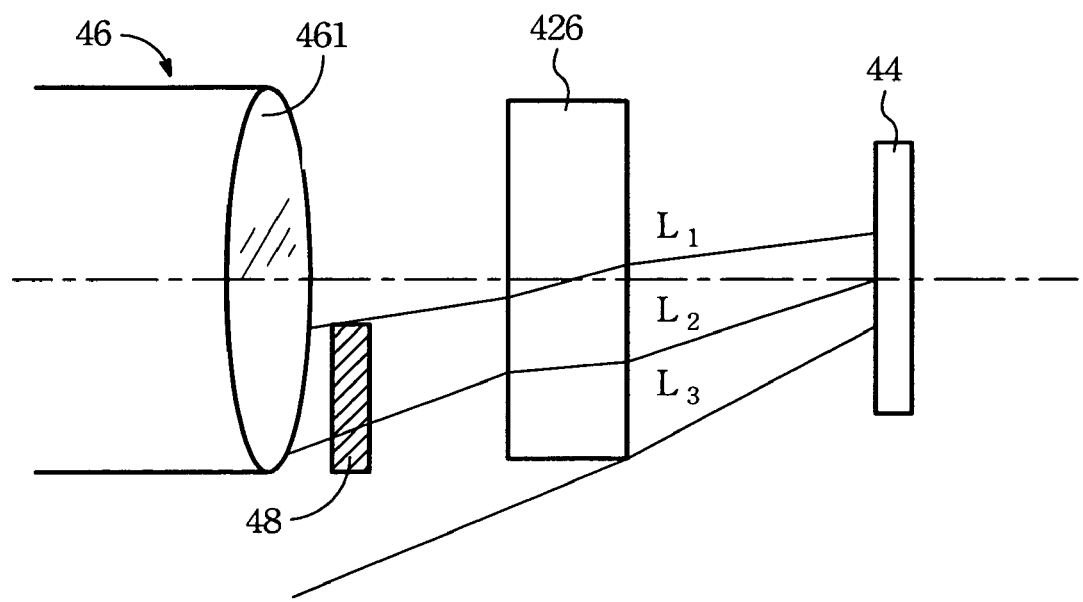
FIG. 5B illustrates the reflected light beams when the tiny mirrors in the DMD chip of the preferred embodiment is in the Flat status.

In order locate the ideal position of the shielding plate 48 within the DLP projector apparatus of the present invention, it is necessary to find out the light path of the reflected light beams when the tiny mirrors are disposed at the "On" "Off" and "Flat" statuses. FIG. 5A illustrates the light path when the tiny mirrors are disposed in the "On" status, wherein all the reflected light beams $L_1$, $L_2$ and $L_3$ enter the projection lens unit 46. FIG. 5B illustrates the light path when the tiny mirrors are disposed at the "Flat" status (i.e. when no modulated voltage is applied onto the DMD chip), wherein only the upper reflected light beam $L_1$ enter the projection lens unit 46 while the central and lower light beams $L_2$ and $L_3$ deviate away from the projection lens unit 46.

As shown in FIG. 5B, when the shielding plate 48 is disposed between the light beams L1 and L3, the ghost image disappears from the projected image. In other words, when the tiny mirrors are disposed at the "Flat" status, the shielding plate 48 prevents the bias light beams from entering into the projection lens unit 46.

An important aspect to note that the distance between the DMD chip 44 and the projection lens unit 46 may vary according to different embodiments. As shown in FIGS. 5A and 5A, in case the more the reflected light path overlap with each other, the more it is required to consider the position of the shielding plate 48 with respect to the projection lens unit 46 in order to eliminate the formation of ghost image.

Figure 6A:
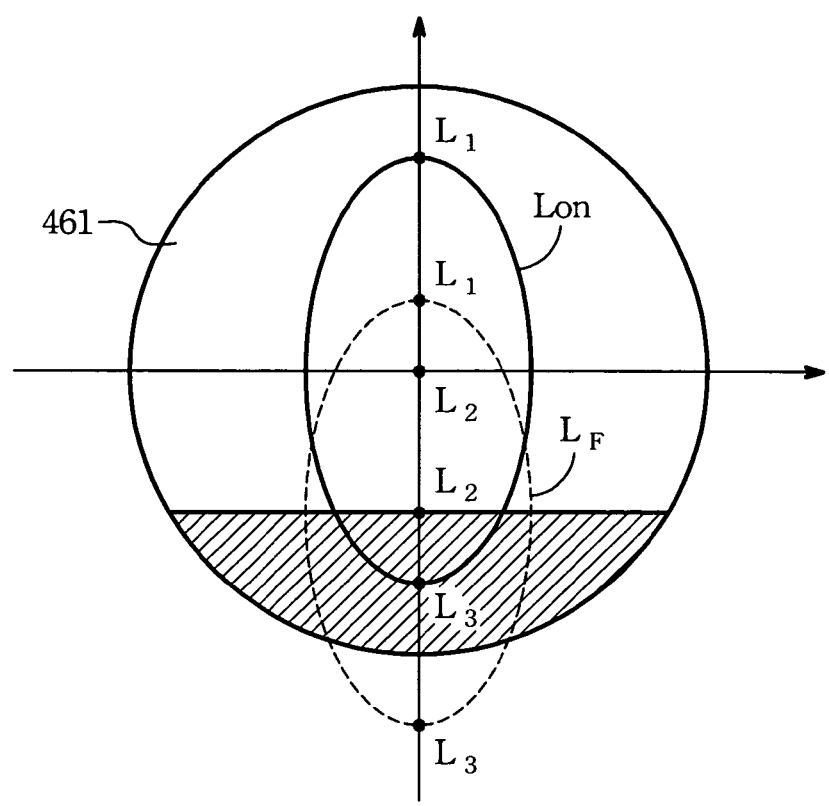
FIG. 6A shows two images generated by the light beams of FIGS. 5A and 5B.

FIG. 6A illustrates two areas caused by the reflected light beams of the DMD chips 44 shown in FIGS. 5A and 5B, wherein $L_{on}$ denotes the area caused when the tiny mirrors are at the "On" status while $L_f$ denotes the area caused when the tiny mirrors are at the "Flat" status. 50% of the areas overlap with each other. Under this condition, in case the shielding plate 48 is disposed in a position so as to cover the entire $L_f$, there may result in insufficiency of reflected light beams $L_{on}$ when the tiny mirrors are at the "On" status. This can affect the clarity of the image projected by the projection lens unit 46. In the preferred embodiment, when the shielding plate 48 is disposed midway of the $L_f$ (i.e. the shielding plate 48 is disposed below the central reflected light beam $L_2$). Under such arrangement, no ghost image is formed in the projected image, thereby providing a fine display ability of the projector apparatus of the present invention.

Figure 6B:
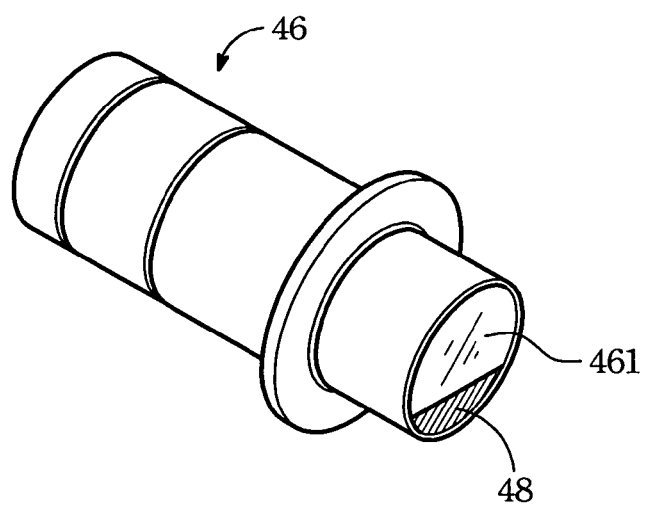
FIG. 6B shows a perspective view of a projector lens unit and a shielding plate employed in the preferred embodiment of the DLP projector apparatus of the present invention.

FIG. 6B illustrates a perspective view of the projection lens unit 46, wherein the shielding plate 48 is disposed on an outer surface of the optical lens 461 in the projection lens unit 46 nearest to the DMD chip 44. Alternately, the shielding plate 48 can be disposed on an inner surface of the optical lens 461 (not shown). In another preferred embodiment, the shielding plate 48 is disposed between the DMD chip 44 and the optical lens 461 (see FIG. 4).

Note that though the shielding plate 48 is disposed on the light path of the reflected light beams when the tiny mirrors are in the "Flat" status, the presence of the shielding plate 48 should not hinder the entry of 70%-99.9% of the reflected light beams when the tiny mirrors are at the "On" status into the projection lens unit 46. In other words, the shielding plate 48 can cover no more than 30% of the reflected light beams when the entire tiny mirrors are in the "On" status. The shielding plate 48 provides a shielding rate ranging between 0.1% to 30% of the reflected light beams.

With the utility of the shielding plate 48 in the projector apparatus of the present invention and by appropriate adjustment of the shielding plate 48 with respect to the projection lens unit 46 and the DMD chip 44, formation of ghost image in the projected image can be eliminated.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A projector apparatus comprising:
    a light source for producing light beams;
    a micromirror device including an array of micromirrors for modulating and reflecting the light beams into image light beams;
    a projection lens unit for magnifying and projecting the image light beams to form a projected image, the projection lens unit including an optical lens disposed adjacent to the micromirror device; and
    a light shielding plate mounted on the optical lens for shielding a bias light reflected from the micromirror device to prevent the bias light reflected from the micromirror device from entering the projection lens unit so as to prevent a ghost image resulted from the bias light from being formed in the projected image.

2. The projector apparatus according to claim 1, wherein the micromirror device defines a common plane, the light shielding plate being disposed on a path of the light beams reflected from the micromirrors when the micromirrors are parallel to the common plane.

3. The projector apparatus according to claim 1, wherein the light shielding plate is disposed on a light path of the light beams reflected from the micromirrors when the micromirrors are in a "Flat" status.

4. The projector apparatus according to claim 1, wherein the light shielding plate provides a shielding rate ranging between 0.1% to 30% of the image light beams.

5. A projector apparatus comprising:
    a light source for producing light beams;
    a micromirror device for modulating and reflecting the light beams into image light beams, the micromirror device including an array of micromirrors disposed in "On" or "Off" status when different modulated voltages are applied thereupon, the image light beams being reflected from the array of micromirrors to form image light beams when the array of micromirrors is in the "On" status, the array of micromirrors being in a "Flat" status when no modulated voltage is applied thereupon;
    a projection lens unit for magnifying and projecting the image light beams to form a projected image, the projection lens unit including an optical lens disposed adjacent to the micromirror device; and
    a light shielding plate mounted on the optical lens in such a manner that the light shielding plate is disposed on a path of the light beams reflected from the micromirrors when the array of micromirrors is in the "Flat" status so as to prevent the light beams reflected from the micromirrors from entering the projection lens unit.

6. The projector apparatus according to claim 5, wherein the light shielding plate provides a shielding rate ranging between 0.1% to 30% of the image light beams.

7. A shielding plate for use in a projector apparatus, the projector apparatus including a light source, a micromirror device, and a projection lens unit, the light source producing light beams for the micromirror device, the micromirror device including an array of micromirrors for modulating and reflecting the light beams into image light beams, the projection lens unit magnifying and projecting the image light beams to form a projected image, the projection lens unit including an optical lens disposed adjacent to the micromirror device, wherein the shielding plate is disposed on the optical lens for shielding a bias light reflected from the micromirror device to prevent the bias light reflected from the micromirror device from entering the projection lens unit and preventing a ghost image resulted from the bias light from being formed in the projected image.

8. The shielding plate according to claim 7, wherein the micromirror device is a digital micromirror device.

9. The shielding plate according to claim 7, wherein the shielding plate provides a shielding rate ranging 0.1% to 30% of the image light beams.

* * * * *